(12) United States Patent
Huang et al.

(10) Patent No.: US 8,028,789 B2
(45) Date of Patent: Oct. 4, 2011

(54) CONTROL ADAPTATION OF VARIABLE GEAR RATIO STEERING

(75) Inventors: Jihua Huang, Sterling Heights, MI (US); William C. Lin, Birmingham, MI (US); Yuen-Kwok Chin, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 610 days.

(21) Appl. No.: 12/183,852

(22) Filed: Jul. 31, 2008

(65) Prior Publication Data

US 2010/0025144 A1   Feb. 4, 2010

(51) Int. Cl.
*B62D 5/00* (2006.01)
*B62D 6/00* (2006.01)

(52) U.S. Cl. ........ 180/443; 180/417; 180/421; 180/446; 701/41; 701/42

(58) Field of Classification Search .................. 180/401, 180/417–423, 443, 444, 446; 701/41, 42
See application file for complete search history.

(56) References Cited

U.S. PATENT DOCUMENTS

| 5,423,391 | A | * | 6/1995 | Shimizu ........................ 180/446 |
| 6,155,377 | A | * | 12/2000 | Tokunaga et al. .............. 180/446 |
| 7,066,295 | B2 | * | 6/2006 | Ohta et al. .................... 180/422 |
| 2005/0203646 | A1 | * | 9/2005 | Makino et al. .................. 700/79 |
| 2007/0261909 | A1 | * | 11/2007 | Higashi et al. ................ 180/446 |
| 2008/0264714 | A1 | * | 10/2008 | Morikawa ...................... 180/446 |

* cited by examiner

*Primary Examiner* — Kevin Hurley
*Assistant Examiner* — Marc Scharich
(74) *Attorney, Agent, or Firm* — John A. Miller; Miller IP Group, PLC

(57) ABSTRACT

An adaptive control VGR steering system that varies the steering gear ratio between a vehicle hand-wheel angle and the road wheel angle based on vehicle speed and one or more of hand-wheel angle, driver attentiveness and a driver's driving style and skill.

19 Claims, 6 Drawing Sheets

-- Yaw rate gain with conventional VGR
— Desired yaw rate gain (with enhanced VGR)

CONTROL ADAPTATION OF VARIABLE GEAR RATIO STEERING

BACKGROUND OF THE INVENTION

1. Field of the Invention

This invention relates generally to an adaptive control variable gear ratio (VGR) steering system and, more particularly, to an adaptive control VGR steering system that changes the gear ratio between a vehicle hand-wheel angle and the road wheel angle based on vehicle speed and one or more of hand-wheel angle, driver driving style and skill, and driver attentiveness.

2. Discussion of the Related Art

The steering gear ratio of a vehicle is a proportional factor between the steering wheel angle and the road wheel angle. Conventional steering systems have a fixed steering gear ratio, where the steering gear ratio remains substantially constant except for minor variations due to the suspension geometry of the vehicle. In order to improve handling for all driving conditions, variable gear ratio (VGR) steering systems have been provided. For VGR steering systems, the gear ratio varies with vehicle speed so that the number of steering wheel turns to make a vehicle turn is low at low vehicle speeds and high for high vehicle speeds. In other words, the gear ratio between the vehicle hand-wheel angle and the road wheel angle increases as the vehicle speed increases so that turning is easier at lower speeds and steering sensitivity is suppressed at higher speeds where stability may be a factor. The VGR steering system can be implemented by adding an angle to or subtracting an angle from the driver's steering input using a gear differential between the steering wheel and the steering gear. A planetary gear set or a harmonic drive can be used to create such a differential.

Known steering systems focus on the steering response of on-center handling, where the steering wheel angle is relatively small and the tires are in their linear region. As the steering wheel angle increases and the tires enter their non-linear region, the vehicle steering sensitivity decreases, requiring the driver to steer more to maintain a desired steering-to-yaw-rate gain.

Practically, the design of known steering systems is a compromise to meet the needs of all types of drivers with one single speed-VGR curve. Nonetheless, many customers, especially sporty drivers, expect electric aids to enhance their driving experience, even in situations that an average driver would never encounter. Also, automotive enthusiast magazines show that vehicle evaluation often focuses on high-performance driving. The challenge for the design is to create a system that satisfies average drivers as well as motor sport enthusiasts.

In addition, a drivers psychological and physiological conditions also affect his or her ability to control a vehicle safely. Although the detection of a driver's psychological condition, such as emotion and stress, is still immature, various systems have been developed to detect a drivers physiological conditions. Vehicle control systems, such as VGR steering systems, should be able to work with those driver-condition detection systems and adapt themselves to driver conditions to further enhance roadway safety.

SUMMARY OF THE INVENTION

In accordance with the teachings of the present invention, an adaptive control VGR steering system is disclosed that varies the steering gear ratio between a vehicle hand-wheel angle and road wheel angle based on vehicle speed and one or more of hand-wheel angle, driver attentiveness, drivers driving style and skill.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an adaptive control VGR steering system that considers vehicle speed and one or more of hand-wheel angle, driver driving style and skill, and driver attentiveness is merely exemplary in nature, and is in no way intended to limit the invention or its applications or uses.

The present invention proposes an adaptive control VGR steering system that contains three main functions, namely an enhanced VGR that alters the steering ratio according to both the vehicle speed and the steering angle to provide an approximately uniform steering to yaw-rate gain at each specific vehicle speed, an adaptive VGR that adapts the VGR to a driver's preference/style and skill, and an adaptive VGR that adapts the VGR to driver's physiological conditions, such as drowsiness and inattention.

Figure 1:
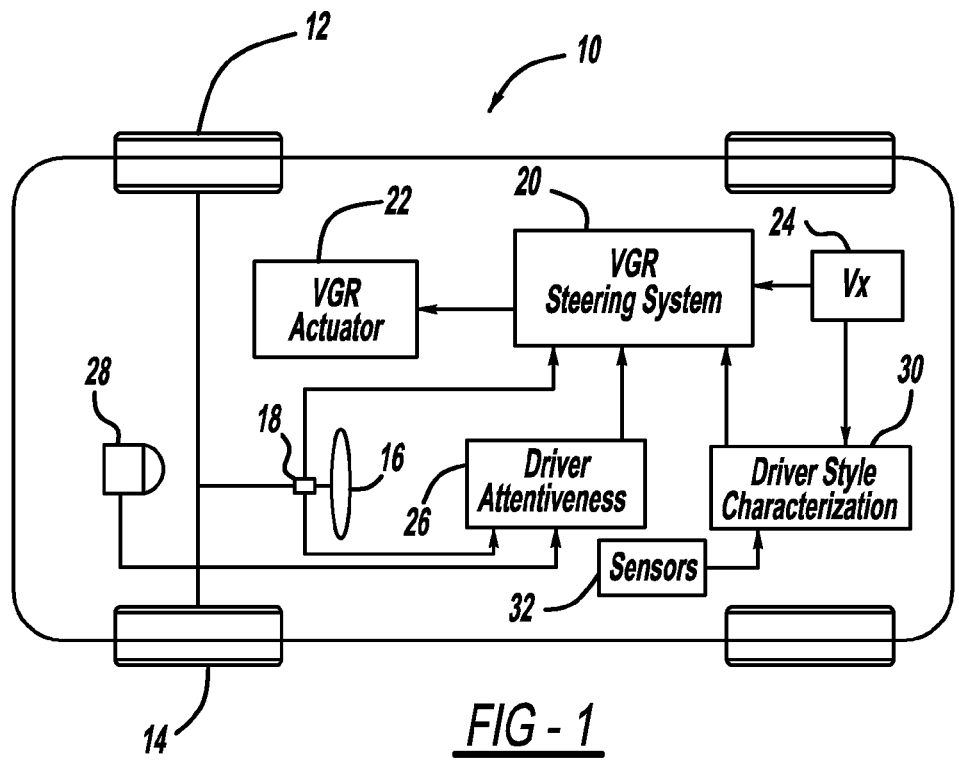
FIG. 1 is a plan view of a vehicle including an adaptive control variable gear ratio steering system, according to an embodiment of the present invention.

FIG. 1 is a plan view of a vehicle 10 including steerable front wheels 12 and 14 steered by a vehicle hand-wheel 16. A hand-wheel angle sensor 18 provides a hand-wheel angle δ identifying the turning angle of the hand-wheel 16. The vehicle 10 also includes an adaptive VGR steering system 20 that controls a VGR actuator 22 to change the gear ratio between the hand-wheel angle δ and the road wheel angle of the tires 12 and 14, as will be discussed in greater detail below. The VGR actuator 22 is intended to represent any of the known devices that can adjust the gear ratio between the hand-wheel angle δ and the road wheel angle known in the art, including steer-by-wire devices. As mentioned above, typical VGR steering systems only base the change in the VGR in response to vehicle speed, such as from a vehicle speed sensor 24.

According to the invention, the VGR steering system 20 includes other inputs to set the VGR between the hand-wheel 16 and the tires 12 and 14. Particularly, the VGR steering system 20 may control the VGR based on vehicle speed v and the hand-wheel angle δ, which is provided by the hand-wheel angle sensor 18. Additionally, the VGR steering system 20 may control the VGR based on the vehicle speed v, the hand-wheel angle δ and/or driver attentiveness. Particularly, a driver attentiveness system 26 receives signals from a suitable detection device, such as a camera 28, that determines whether the driver of the vehicle 10 is drowsy, inattentive, etc. Attentiveness detectors and systems that provide these functions are well known to those skilled in the art. Additionally, the VGR steering system 20 may consider the drivers driving style and skill, i.e., conservative, sporty, novice, highly skilled, etc., provided by a driver style and skill characterization processor 30. The style and skill characterization processor 30 can be any suitable system for the purposes discussed herein, and receive suitable sensor signals from sensors 32 that are on the vehicle 10. U.S. patent application Ser. No. 12/179,048, titled Adaptive Vehicle Control System with Driving Style Recognition, filed Jul. 24, 2008, assigned to the assignee of this application and herein incorporated by reference, discloses one representative example of a system that provides driver driving style and skill suitable for the purposes described herein.

Figure 2:
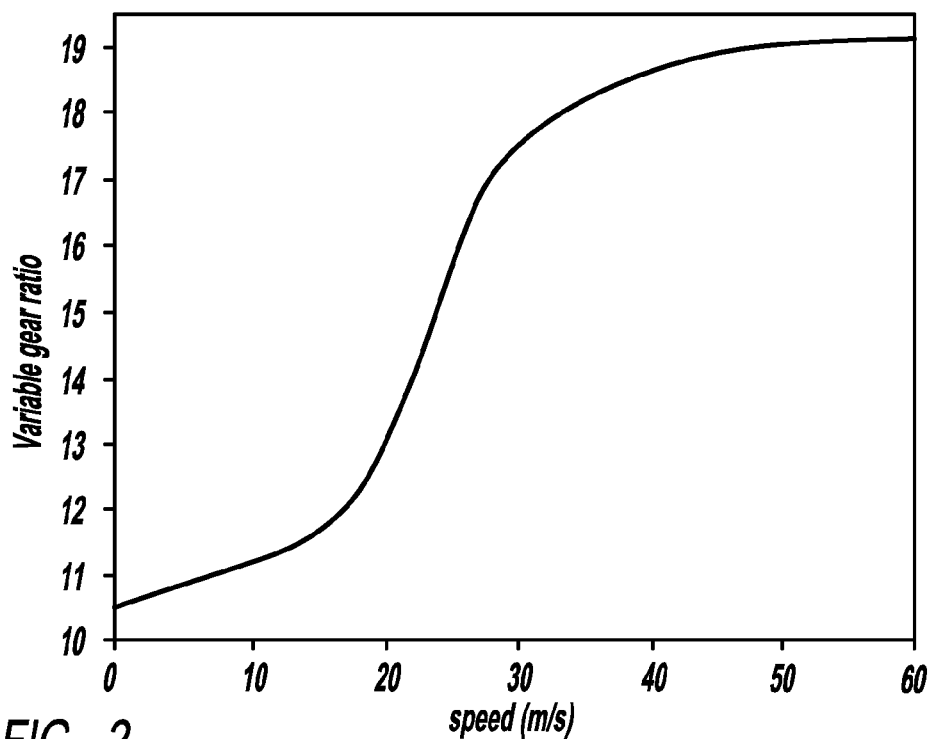
FIG. 2 is a graph with vehicle speed on the horizontal axis and variable gear ratio on the vertical axis showing a known speed-based VGR curve.
Figure 3:
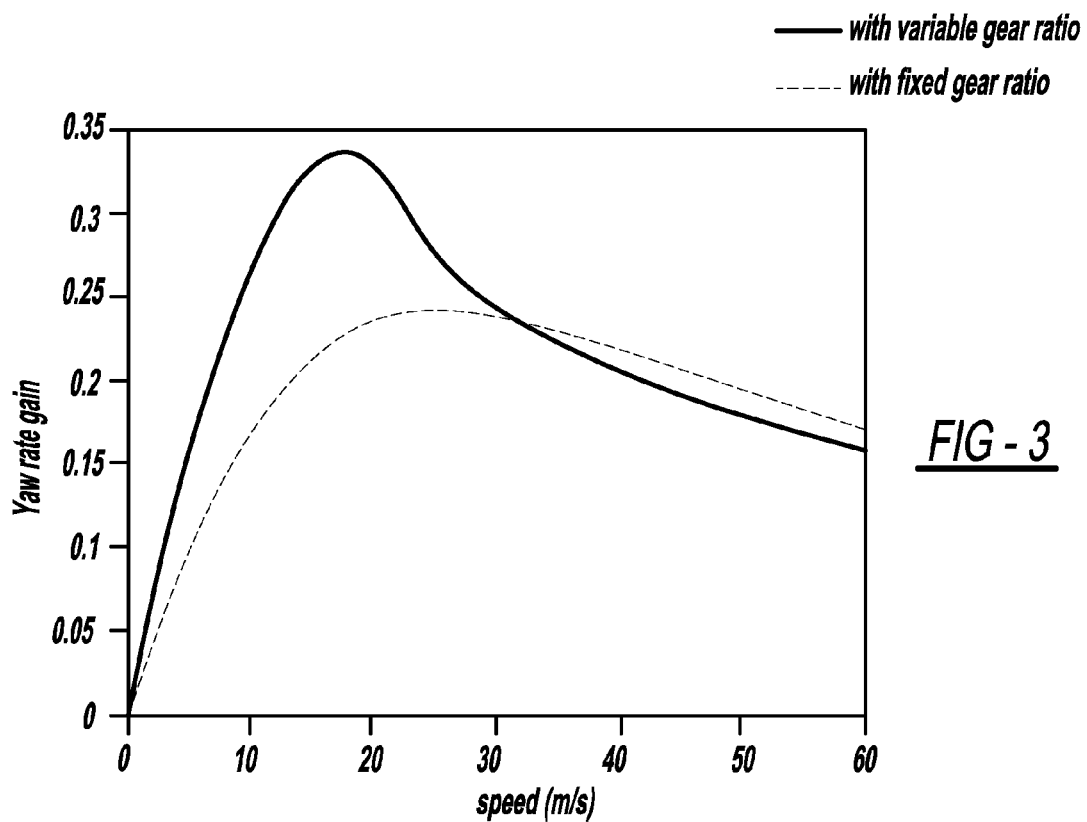
FIG. 3 is a graph with vehicle speed on the horizontal axis and yaw-rate gain on the vertical axis showing a yaw-rate gain for a variable gear ratio and a fixed gear ratio.

Current VGR systems alter the steering ratio r based only on vehicle speed v, i.e., the steering ratio r is a function of the speed r=f(v). FIG. 2 is a graph with speed on the horizontal axis and VGR on the vertical axis showing a typical speed only based VGR curve. A resultant steady-state gain from hand-wheel angle δ to yaw-rate, also referred to as yaw-rate gain, is shown by the graph in FIG. 3. However, the steady-state gain is mainly for on-center handling where the vehicle tires are operating in their linear region. When the hand-wheel angle δ gets relatively large, the steady-state yaw-rate gain drops due to tire nonlinearity.

When the hand-wheel angle δ gets larger than a first critical value $δ_{th}$, about 80° in one specific case, the yaw-rate gain decreases. In other words, the increase in yaw-rate is proportionally smaller than the increase in the steering angle. This indicates that the tire has entered its nonlinear region. Furthermore, as the hand-wheel angle δ gets larger than a second critical value $δ_{sat}$, about 120° in one case, further increases in the hand-wheel angle δ results in a decrease in the steady-state yaw-rate. In such cases, the tire lateral force has saturated.

Figure 4:
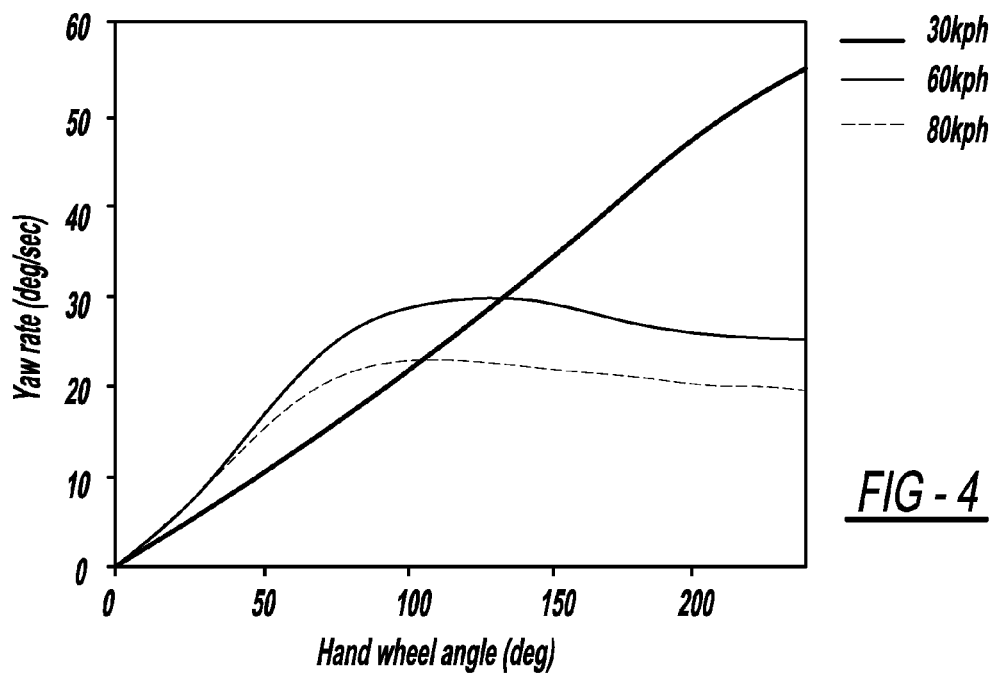
FIG. 4 is graph with hand-wheel angle on the horizontal axis and yaw-rate on the vertical axis showing yaw-rate verses hand-wheel angle for a conventional VGR.
Figure 5:
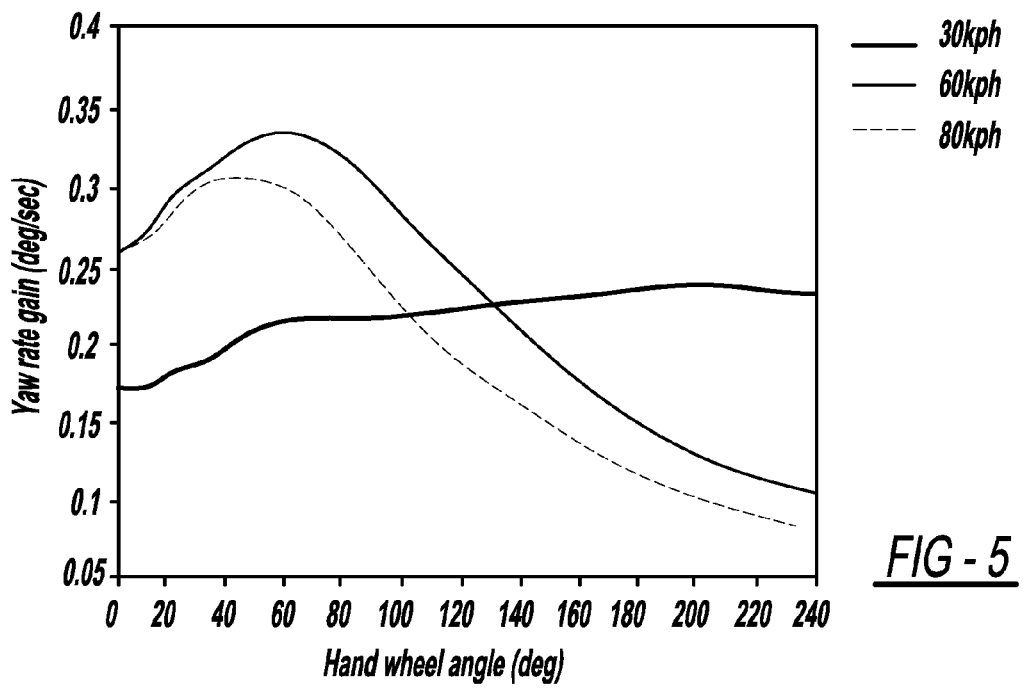
FIG. 5 is a graph with hand-wheel angle on the horizontal axis and yaw-rate gain on the vertical axis showing yaw-rate gain versus hand-wheel angle for a conventional VGR.

It is noted that both the critical values $δ_{th}$ and $δ_{sat}$ vary with vehicle speed. FIGS. 4 and 5 are graphs that show yaw-rate and yaw-rate gain, respectively, at three different vehicle speeds v, namely 30 kph, 60 kph and 80 kph, for different hand-wheel angles δ. As the vehicle speed v increases, the first critical value $δ_{th}$, which causes the tires to enter their nonlinear region, gets smaller. A similar observation can be obtained regarding the second critical value $δ_{sat}$. The underlying reason for such changes is that with the same hand-wheel angle δ the tire slip angle usually gets larger as the vehicle speed v gets larger in order to sustain the required lateral force. Consequently, the necessity to adapt the gear ratio to the magnitude of the hand-wheel angle δ is more significant at higher speed.

Due to tire nonlinearity, a driver has to turn the hand-wheel 16 more in order to achieve a relatively constant yaw-rate gain as the steering angle gets larger. This additional steering effort can impose an unexpected challenge to drivers especially during sudden evasive maneuvers, such as double lane changes. Though yaw stability control has been known for its capability in stabilizing the yaw motion, its activation does not make the yaw-rate gain more uniform for a particular situation. To compensate for the effects of tire nonlinearity and to provide an approximately uniform yaw-rate gain for each speed, the VGR steering system 20 can be extended to be a function of both the vehicle speed v and the hand-wheel angle δ as $r_{enhanced} = f_{enhanced}(v, δ_{HWA})$, according to an embodiment of the present invention.

Figure 6:
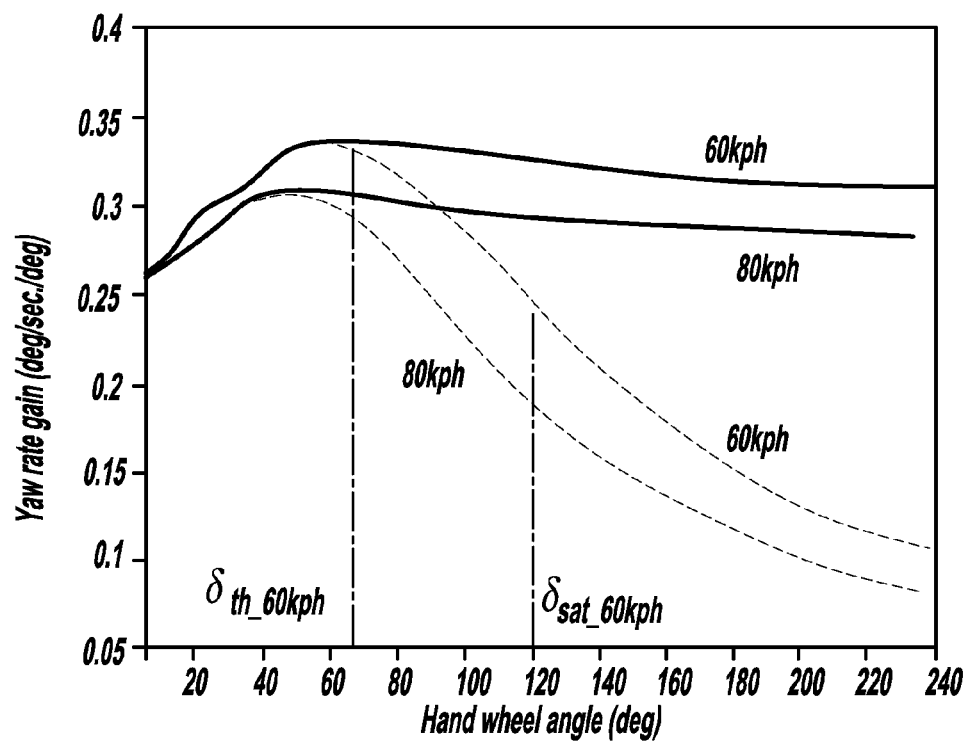
FIG. 6 is a graph with hand-wheel angle on the horizontal axis and yaw-rate gain on the vertical axis showing a desired yaw-rate gain with enhanced VGR at two different vehicle speeds and yaw-rate gain with a conventional VGR at the same two vehicle speeds.
Figure 7:
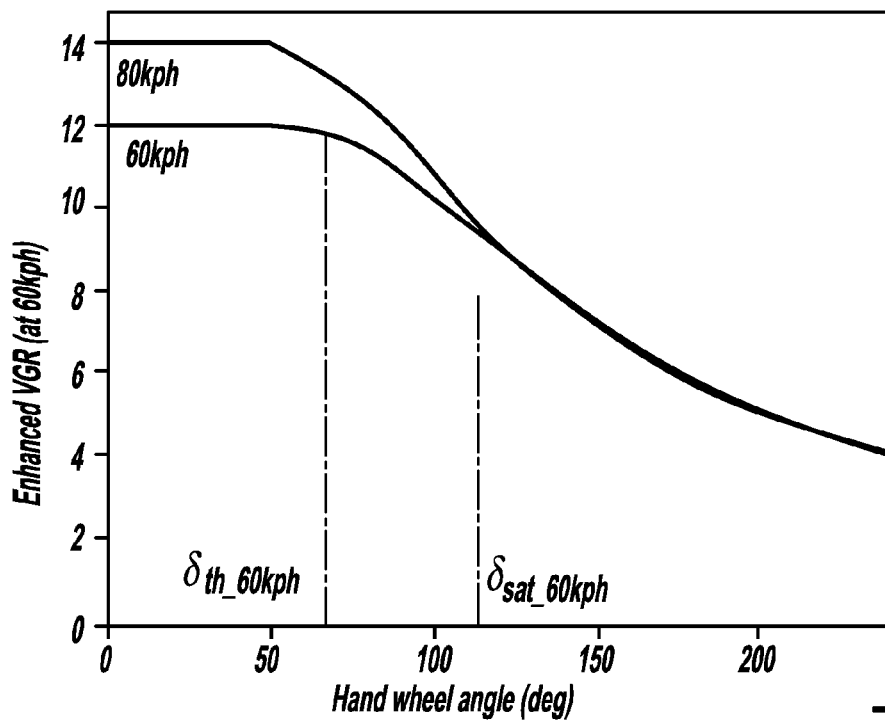
FIG. 7 is a graph with hand-wheel angle on the horizontal axis and VGR on the vertical axis showing the VGR for the enhanced steering system of the invention at two different vehicle speeds.
Figure 8:
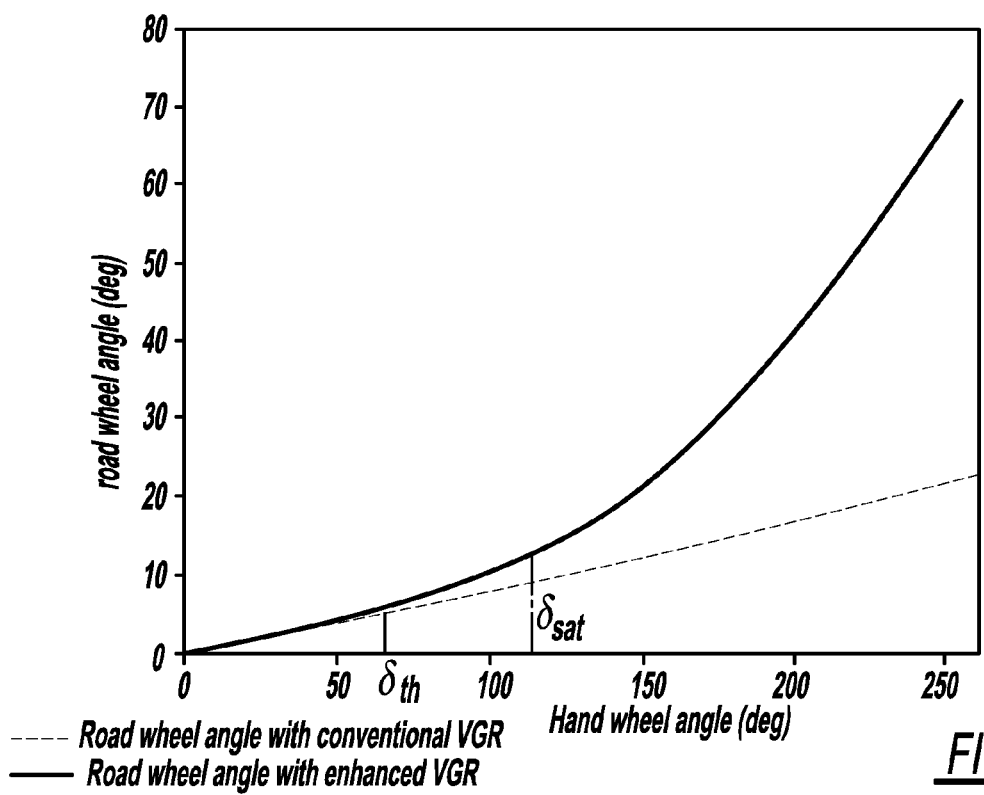
FIG. 8 is a graph with hand-wheel angle on the horizontal axis and road wheel angle on the vertical axis showing the relationship between the hand-wheel angle and the road wheel angle for a conventional VGR and for the VGR of the invention.

FIG. 6 is a graph that shows that the desired yaw-rate gain does not decrease much as the hand-wheel angle δ gets larger than the critical value $δ_{th}$. To achieve such a relatively constant yaw-rate gain, the conventional VGR is modified as shown by the graph in FIG. 7. The enhanced VGR has the same value as the conventional VGR if the hand-wheel angle δ is smaller than the value $δ_{th}$. The VGR decreases as the hand-wheel angle δ increases beyond the value $δ_{th}$. The effect of this enhanced VGR can be clearly shown by examining the resultant road wheel angle as shown in the graph of FIG. 8. The decrease of the steering gear ratio of the enhanced VGR results in an increase in the ratio of the road wheel angle over the hand-wheel angle δ, which compensates for the tire nonlinearity. Note that both the enhanced VGR and the tire angle corresponding to the hand-wheel angle δ beyond the critical value $δ_{sat}$ is fictitious. As the tire lateral force saturates, the road wheel angle should be controlled not to increase even though the hand-wheel angle δ may still increase. The yaw-rate gain beyond the critical value $δ_{sat}$ should be sustained by adding the yaw moment from the yaw stability control.

To accommodate different needs of different drivers, the VGR steering system 20 can also be tailored so that driver preferences/style and skill level, together with the vehicle speed v and the hand-wheel angle δ, can be incorporated to determine the variable gear ratio. Thus, the adaptable VGR can be calculated as:

$$r_{adaptable} = f_{adaptable}(v, δ_{HWA}, P, S) \quad (1)$$

Where p represent driver preference/style, i.e., P=1~5, with 1 representing conservative driver and 5 representing very aggressive drivers, and S represents drivers skill, i.e., S=1~5, with 1 representing a novice or low skill driver and 5 representing highly skillful drivers.

The adaptive VGR can be further derived from the enhanced VGR:

$$r_{adaptable} = f_{adaptable}(vv, δ_{HWA}, P, S) = k(v, δ_{HWA}, P, S) \times f_{enhanced}(v, δ_{HWA}) \quad (2)$$

Where $k(v, δ_{HWA}, P, S)$ is a scaling factor.

The vehicle speed v and the hand-wheel angle δ can be measured by in-vehicle sensors, such as wheel speed sensors and steering angle sensor. Driver preference/style and skill level can be selected by the driver or characterized by algorithms based on vehicle sensor information, which are techniques are known to those skilled in the art.

Since sporty drivers usually prefer the vehicle to be more responsive, a lower gear ratio will be preferred to yield a higher rate gain. On the other hand, drivers need to have the capability to control the vehicle as it become more sensitive with a lower gear ratio, especially at higher speeds. In other words, a lower gear ratio at high speeds will only be allowed to skillful drivers. Therefore, the scaling factor k is smaller for drivers with higher skill, and for drivers with similar skill, the scaling factor k is smaller for more sporty drivers.

Figure 9:
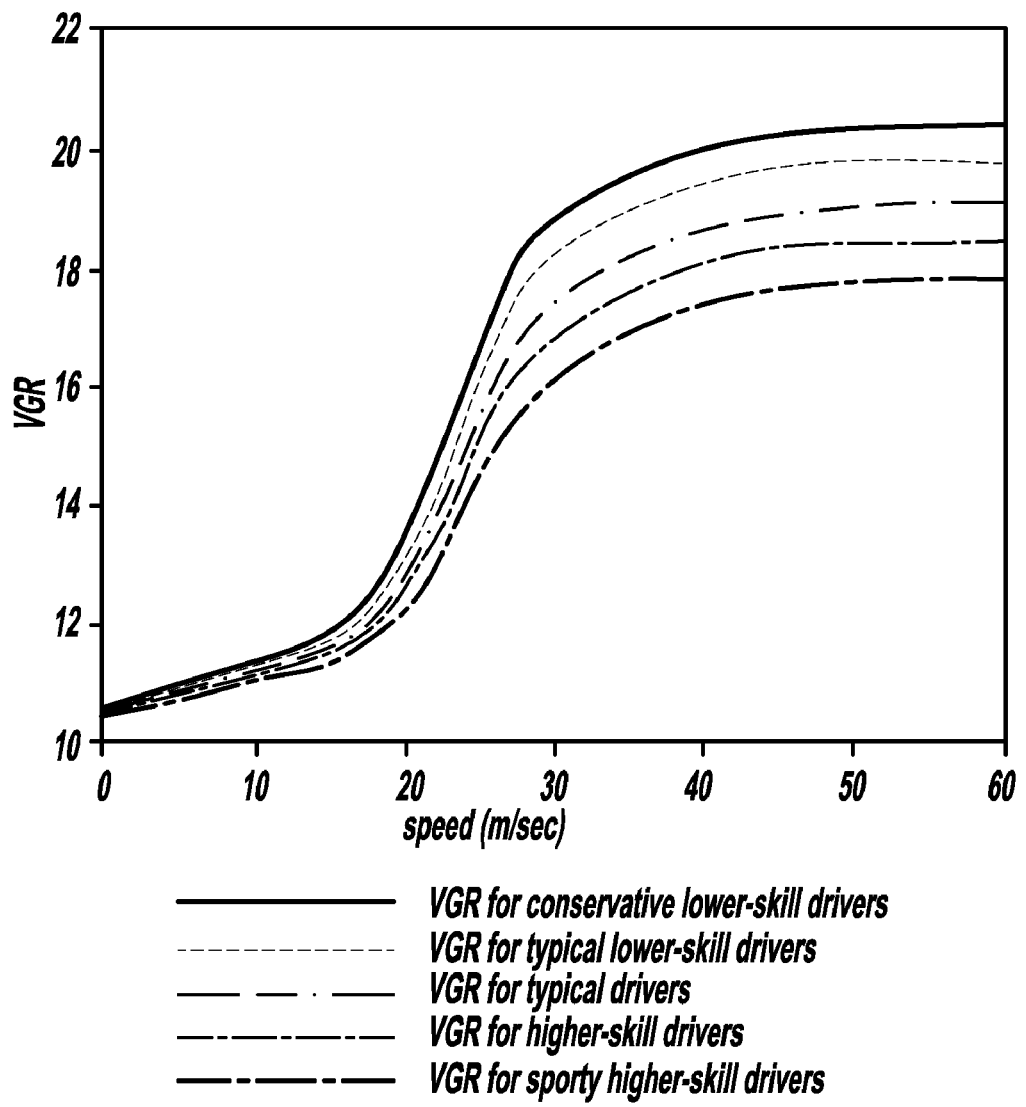
FIG. 9 is a graph with vehicle speed on the horizontal axis and VGR on the vertical axis showing an adaptable VGR for drivers of different driving style and skill levels.

FIG. 9 is a graph with vehicle speed v on the horizontal axis and VGR on the vertical axis showing VGR curves for five different driver skill levels. As the driver skill level increases, the VGR for a particular speed decreases.

Driver drowsiness/inattention is an important contributor to roadway accidents. To improve roadway safety, significant effort has been devoted to develop systems that detect driver drowsiness/inattention, for example, systems that use a camera to detect eye closure and eye gaze direction. Warnings are usually issued to alert the driver upon detection of driver drowsiness. The driver attentiveness system 26 can provide adjustments to the VGR through the VGR steering system 20 in response to a drowsy or inattentive driver.

Figure 10:
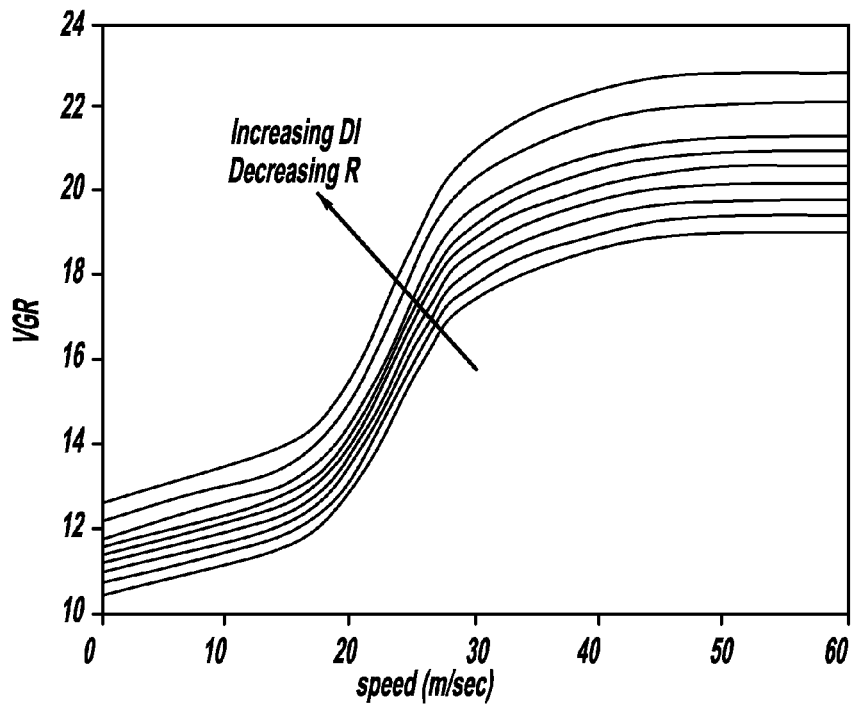
FIG. 10 is a graph with vehicle speed on the horizontal axis and VGR on the vertical axis showing graph lines for VGR settings in response to driver inattentiveness.

FIG. 10 is a graph with vehicle speed v on the horizontal axis and VGR on the vertical axis that shows changes in the VGR setting in response to an increasing DI and a decreasing R, where DI is driver attentiveness and R is a steering activity index that provides an indication of drowsiness. The VGR steering system 20 will increase the variable gear ratio to reduce the sensitivity of road wheel angle to the driver's unintentional steering in response to the detection of the driver's inattention, and will maintain the gear ratio at its nominal ratio to provide normal steering efforts if the driver attentiveness system 26 detects significant steering activity.

Usually, drowsy/inattentive drivers have a tendency to drift out of their lane during straight-line driving since they are often not aware of small variations in the steering angle and therefore fail to correct them in time. Such small variations can and often do cause a gradual lane departure. On the other hand, when drowsy/inattentive drivers turn their steering wheel deliberately to negotiate the curve, they often are relatively alert and do pay attention to the road. Therefore, the VGR adaptation strategy should be different depending on whether the driver is actively steering the hand-wheel 16 or not. If the driver is not actively steering the hand-wheel wheel 16 as, for example, the steering signal shows lack of significant steering displacement and rate, which usually takes place during straight-line driving, the gear ratio should be increased in order to reduce the sensitivity of the road wheel angle to the drivers unintentional steering. Thus, the variation in the road wheel angle is further reduced, helping to keep the vehicle in the lane. On the other hand, if the driver is actively steering the hand-wheel wheel 16, which happens as the driver negotiates a curve or changes lane, the gear ratio should be the nominal ratio to avoid extra steering efforts from the driver. Hence, to take into consideration driver drowsiness/inattention, the adaptable VGR can be modified as:

$$r_{adaptive} = \alpha(DI,R) \times r_{adaptable} = \alpha(DI,R) \times (k(v, \delta_{HWA}, P, S) \times r_{enhanced}(v, \delta_{HWA})) \quad (3)$$

Where DI indicates the driver drowsiness/inattention level, i.e., DI=0~5 with 0 representing a non-drowsy or alert driver and 5 representing a severely drowsy/inattentive driver, and R indicates driver's steering activity or driving condition. For example, R=0~1 with 0 representing the minimum steering activity and 1 the maximum.

The scaling factor a(DI,R) should satisfy $\alpha(DI,R)=1$ if DI=0 (non-drowsy/alert driver) or R=1 (maximum steering activity) and $\alpha(DI,R)>1$, if DI>0 and $0 \leq R \leq 1$. The larger DI is and the smaller R is, the larger $\alpha(DI,R)$.

The value DI can be derived based on driver drowsiness/inattention detection systems, which are known to those skilled in the art. The indicator of active or non-active steering R can be determined based on the magnitude and rate of the hand-wheel angle δ. If the hand-wheel angle δ is usually small, i.e. smaller than 5 degrees and the change rate of the hand-wheel angle δ is usually small, i.e., smaller than 10 degree/second, the driver's steering is deemed non-active and R is set to 0. If the hand-wheel angle δ is relatively large or its change rate is also relatively large, the driver's steering action is regarded as active and R is set to a higher value. Other information, such as road geometry from a forward-looking camera or GPS with an EDMap, can also be incorporated in the determination of R.

Figure 11:
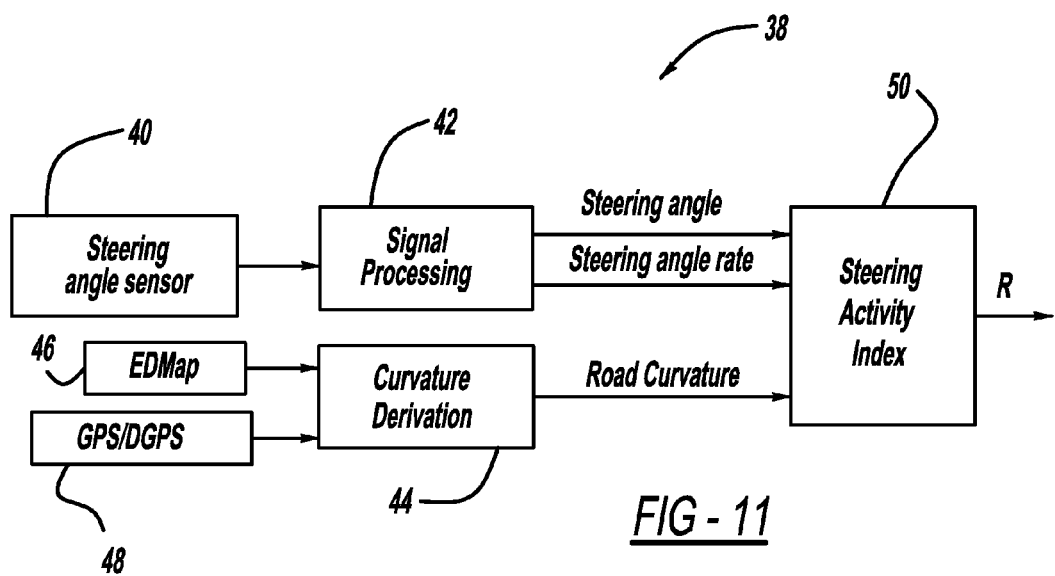
FIG. 11 is a block diagram for determining driver inattentiveness.

FIG. 11 is a block diagram of a system 38 that can be used to determine the steering activity index R that can be part of the driver attentiveness system 26. The steering wheel angle can be measured directly using a steering angle sensor 40 and the steering angle rate can be derived by differentiating the steering angle measurement using a signal processor 42. The road curvature can be derived by a processor 44 using for example, an EDMap 46 and a GPS/DGPS system 48. Alternative techniques to derive road curvature include processing images from a forward-looking radar and measurements from a forward-looking radar.

With the three types of information, namely the wheel steering angle δ, the steering angle rate and the road curvature, the steering activity index R can be computed by a processor 50. One example of such a computation is:

$$R = \frac{|c_1 \delta_{HWA} + c_2 \dot{\delta}_{HWA}| + c_3 |\rho|}{c_1 \delta_{max} + c_2 \dot{\delta}_{max} + c_3 \rho_{max}} \quad (4)$$

Where $$\dot{\delta}_{HWA} \left( \dot{\delta}_{HWA} = \frac{d \delta_{HWA}}{dt} \right)$$

is the steering angle rate, ρ is the road curvature, $\delta_{max}$ and $\dot{\delta}_{max}$ are pre-defined maximum values (constants) for the steering angle and the steering angle rate, respectively, and $\rho_{max}$ is a pre-defined maximum value for the road curvature. Note that the index R is a function of time since $\delta_{HWA}$, $\dot{\delta}_{HWA}$ and ρ vary as the driver drives along the road. Moreover, vehicle speed v can also be incorporated in the computation to further determine its effect on the coefficients $c_1$, $c_2$ and $C_3$ and the pre-determined maximum values can be made speed-dependent.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An adaptive control variable gear ratio (VGR) steering system for a vehicle, said system comprising:
   a VGR device that changes a gear ratio between a hand-wheel angle of a hand-wheel of the vehicle and a road wheel angle of the vehicle;

a vehicle speed sensor providing a vehicle speed signal of a speed of the vehicle;

a hand-wheel angle sensor providing a hand-wheel angle signal of the hand-wheel angle of the vehicle;

a VGR sub-system that provides a VGR signal to the VGR device for changing the gear ratio, said VGR sub-system using the vehicle speed signal and the hand-wheel angle signal to determine the gear ratio based on a combination of both vehicle speed and a desired yaw-rate gain; and a style and skill characterization processor that is responsive to vehicle sensor signals from vehicle sensors, said style and skill characterization processor determining a driver's driving style and skill, said style and skill characterization processor providing a driver's driving style and skill signal to the VGR sub-system of the type of driver driving the vehicle, said VGR sub-system using the vehicle speed signal, the hand-wheel angle signal and the driver's driving style and skill signal to determine the gear ratio, where the gear ratio is reduced from a nominal value as the vehicle speed increases for drivers of greater skill.

2. The system according to claim 1 further comprising a driver attentiveness processor that is responsive to vehicle sensor signals from vehicle sensors, said driver attentiveness processor determining an attentiveness of the vehicle driver, said driver attentiveness processor providing a driver attentiveness signal to the VGR sub-system identifying how attentive the driver is, said VGR sub-system determining the gear ratio based on the vehicle speed signal, the hand-wheel angle signal, the driver's driving style and skill signal and the driver attentiveness signal, where the gear ratio is increased from a nominal value as the vehicle speed increases for drivers that are less attentive.

3. The system according to claim 2 wherein the driver attentiveness processor includes a signal processor that receives the hand-wheel angle signal and provides a steering angle signal and a steering angle rate signal, a curvature derivation processor that provides a road curvature signal and a steering activity index processor that receives the steering angle signal, the steering angle rate signal and the road curvature signal, said steering activity index processor calculating a steering activity index that identifies a driver's steering activity, said steering activity index being combined with the driver attentiveness signal, where the gear ratio is increased from the nominal value as the vehicle speed increases for increases in steering activity.

4. The system according to claim 3 wherein the curvature derivation processor receives signals from a digital map and a GPS to determine the road curvature.

5. The system according to claim 2 wherein the driver attentiveness processor determines whether a driver of the vehicle is drowsy to determine the driver attentiveness signal.

6. The system according to claim 2 wherein one of the vehicle sensors is a camera that provides images of the driver.

7. The system according to claim 3 wherein the steering activity index processor uses the following equation to determine the steering activity index:

$$R = \frac{|c_1 \delta_{HWA} + c_2 \dot{\delta}_{HWA}| + c_3|\rho|}{c_1 \delta_{max} + c_2 \dot{\delta}_{max} + c_3 \rho_{max}}$$

Where R is the steering activity index, $\dot{\delta}_{HWA}$ is the steering angle rate, $\delta_{HWA}$ is the hand-wheel angle, $\rho$ is the road curvature, $\delta_{max}$ and $\dot{\delta}_{max}$ are pre-defined maximum values for the steering angle and the steering angle rate, respectively, $\rho_{max}$, is a pre-defined maximum value for the road curvature and $c_1$, $c_2$ and $c_3$ are predetermined coefficients.

8. The system according to claim 1 wherein the VGR sub-system decreases the gear ratio if the hand-wheel angle increases above a critical threshold value where vehicle tires operate in a non-linear region of lateral force versus tire side slip angle.

9. The system according to claim 8 wherein the critical threshold value decreases as the vehicle speed increases.

10. An adaptive control variable gear ratio (VGR) steering system for a vehicle, said system comprising:

a VGR device that changes a gear ratio between a hand-wheel angle of a hand-wheel of the vehicle and a road wheel angle of the vehicle;

a vehicle speed sensor providing a vehicle speed signal of a speed of the vehicle;

vehicle sensors that provide parameters of the operation of the vehicle;

a style and skill characterization processor that is responsive to vehicle sensor signals from the vehicle sensors, said style and skill characterization processor determining a driver's driving style and skill and providing a driver's driving style and skill signal; and a VGR sub-system that provides a VGR signal to the VGR device for changing the gear ratio, said VGR sub-system determining the VGR signal based on the speed of the vehicle and the driver's driving style and skill, where the gear ratio is reduced from a nominal value as the vehicle speed increases for drivers of greater skill.

11. An adaptive control variable gear ratio (VGR) steering system for a vehicle, said system comprising:

a VGR device that changes a gear ratio between a hand-wheel angle of a hand-wheel of the vehicle and a road wheel angle of the vehicle;

a vehicle speed sensor providing a vehicle speed signal of a speed of the vehicle;

vehicle sensors that provide vehicle sensor signals identifying parameters of the operation of the vehicle;

a driver attentiveness processor that is responsive to the vehicle sensor signals, said driver attentive processor determining an attentiveness of the vehicle driver, said driver attentiveness processor providing a driver attentiveness signal identifying how attentive the driver is; and a VGR sub-system that provides a VGR signal to the VGR device for changing the gear ratio, said VGR sub-system determining the gear ratio based on the vehicle speed signal and the driver attentiveness signal, where the gear ratio is increased from a nominal value as the vehicle speed increases for drivers that are less attentive.

12. The system according to claim 11 further comprising a hand-wheel angle sensor providing a hand-wheel angle signal identifying the rotation of the hand-wheel of the vehicle, said VGR sub-system using the hand-wheel angle signal to change the gear ratio based on a combination of vehicle speed, driver attentiveness and a desired yaw-rate gain.

13. The system according to claim 12 wherein the driver attentiveness processor includes a steering activity index processor that calculates a steering activity index that identifies a driver's steering activity, said steering activity index being combined with the driver attentiveness signal, where the gear ratio is increased from a nominal value as the vehicle speed increases for increases in steering activity.

14. The system according to claim 13 wherein the driver attentiveness processor further includes a signal processor that receives the hand-wheel angle signal and provides a steering angle signal and a steering angle rate signal and a curvature derivation processor that provides a road curvature signal, said steering activity index processor being responsive to the steering angle signal, the steering angle rate signal and the road curvature signal to calculate the steering activity index.

15. The system according to claim 14 wherein the steering activity index processor uses the following equation to determine the steering activity index:

$$R = \frac{|c_1 \delta_{HWA} + c_2 \dot{\delta}_{HWA}| + c_3|\rho|}{c_1 \delta_{max} + c_2 \dot{\delta}_{max} + c_3 \rho_{max}}$$

Where R is the steering activity index, $\dot{\delta}_{HWA}$ is the steering angle rate, $\delta_{HWA}$ is the hand-wheel angle, $\rho$ is the road curvature, $\delta_{max}$ and $\dot{\delta}_{max}$ are pre-defined maximum values for the steering angle and the steering angle rate, respectively, $\rho_{max}$ is a pre-defined maximum value for the road curvature and $c_1$, $c_2$ and $c_3$ are predetermined coefficients.

16. The system according to claim 11 wherein the VGR sub-system decreases the gear ratio if the hand-wheel angle increases above a critical threshold value where vehicle tires operate in a non-linear region of lateral force versus tire side slip angle.

17. The system according to claim 16 wherein the critical threshold value decreases as the vehicle speed increases.

18. The system according to claim 11 wherein the driver attentiveness processor determines whether the vehicle driver is drowsy to determine the driver attentiveness signal.

19. The system according to claim 11 wherein one of the vehicle sensors is a camera that provides images of the vehicle driver.

* * * * *